May 21, 1957   A. E. BRYCE   2,792,608
SAFETY PIN FASTENERS FOR BUTTONS
Filed July 26, 1955   2 Sheets-Sheet 1

Allan E. Bryce
INVENTOR.

BY *Clarence A. O'Brien*
*and Harvey B. Jackson*
Attorneys

May 21, 1957 A. E. BRYCE 2,792,608
SAFETY PIN FASTENERS FOR BUTTONS
Filed July 26, 1955 2 Sheets-Sheet 2

Allan E. Bryce
INVENTOR.

BY *Clarence A. O'Brien*
*and Harvey B. Jackson*
Attorneys

United States Patent Office 2,792,608
Patented May 21, 1957

2,792,608

SAFETY PIN FASTENERS FOR BUTTONS

Allan E. Bryce, Providence, R. I.

Application July 26, 1955, Serial No. 524,384

3 Claims. (Cl. 24—103)

My invention relates to improvements in safety pin fasteners for detachably attaching drilled shank buttons to fabric or the like.

The primary object of my invention is to provide a fastener of the type and for the purpose above set forth embodying snap action means for locking to one end of a body section one end of a pin section pivoted at its other end on the other end of the body section for opening and closing the fastener, the pin section being curved for easy insertion through and removal out of a drilled shank of a button and a piece of fabric.

Another object is to provide snap action locking means including a clasp on one end of the body section and squeeze means for releasing the clasp.

Still another object is to provide a fastener of the type and for the purpose above specified which is comparatively inexpensive to manufacture, will not accidentally open and is strong and durable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
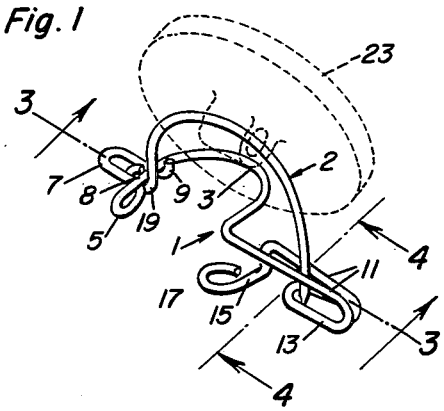
Figure 1 is a perspective view of a preferred embodiment of my improved fastener closed with the pin section inserted through the drilled shank of a bottom shown in broken lines.
Figure 2:
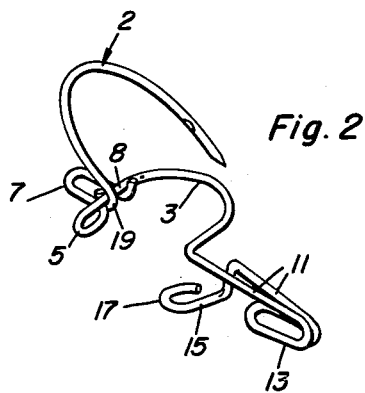
Figure 2 is a perspective view of the same showing the fastener open.
Figure 3:
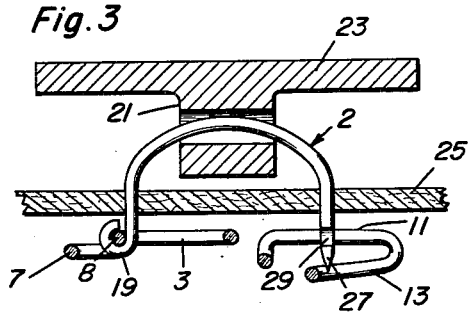
Figure 3 is an enlarged view in longitudinal section taken on the line 3—3 of Figure 1 and showing the pin section inserted through the drilled shank of a button and through a piece of fabric and the fastener closed.
Figure 4:
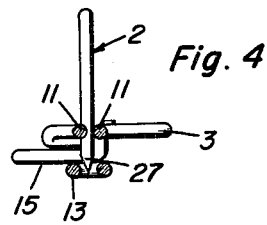
Figure 4 is an enlarged view in transverse section taken on the line 4—4 of Figure 1.
Figure 5:
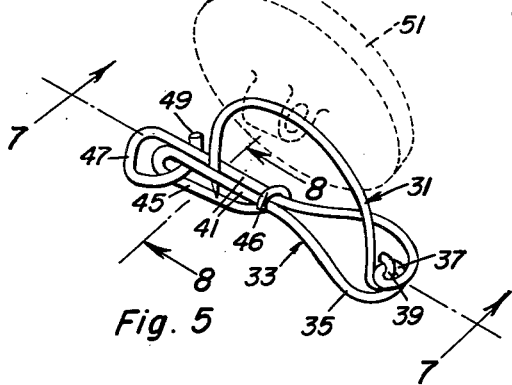
Figure 5 is a perspective view of a first modified form of the fastener closed and with the pin section inserted through the drilled shank of a button shown in broken lines.
Figure 6:
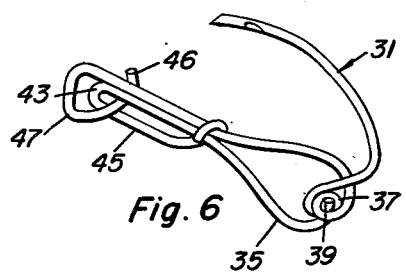
Figure 6 is a perspective view of the first modified form with the fastener open.
Figure 7:
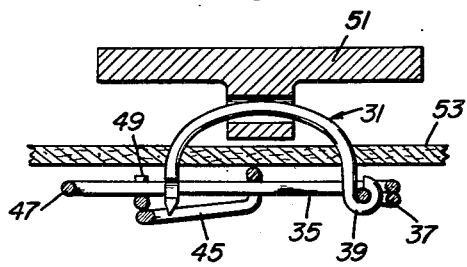
Figure 7 is a view in longitudinal section taken on the line 7—7 of Figure 5 with the pin section inserted through the drilled shank of a button and a piece of fabric shown in full lines and showing the fastener closed.
Figure 8:
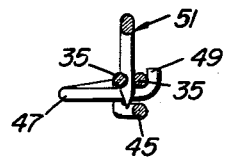
Figure 8 is a view in transverse section taken on the line 8—8 of Figure 5.
Figure 9:
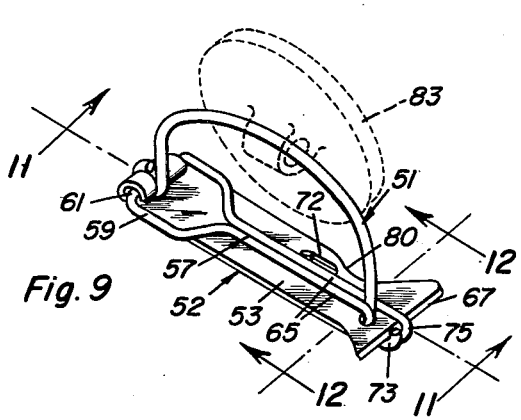
Figure 9 is a perspective view of a second modified form of the fastener closed and with the pin section inserted through the shank of a button shown in broken lines.
Figure 10:
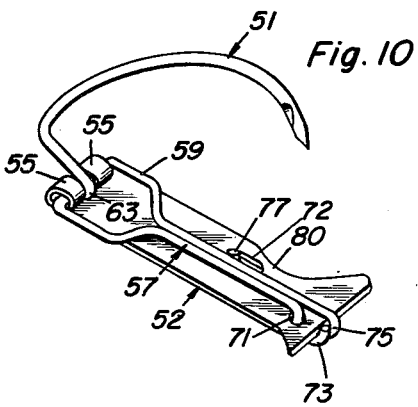
Figure 10 is a perspective view of the second modified form with the fastener open.

Referring to the drawings by numerals, according to the preferred embodiment of my invention as shown in Figures 1 to 4, the fastener includes an elongated body section 1 and a pin section 2 each formed of a piece of resilient wire.

The body section 1 is bent to provide a lateral intermediate bowed finger grip 3. At one end of the body section 1, the finger grip 3 is return bent, as at 5, and again bent to form an end loop 7 on the body section extending outwardly of said grip 3 longitudinally of the body section 1 in a plane parallel with said grip 3 and which terminates in an end hook 9 hooked into said grip, a portion 8 of which extends across said loop 7, all for a purpose presently seen.

At its other end, the body section 1 is bent to provide outwardly of the finger grip 3 a pair of side-by-side longitudinal, relatively separable clasp portions 11 for the pin section 2, and a subjacent guard loop 13 for said pin section return bent from said portions 11 and resiliently connecting said clasp portions together. One of the portions 11 terminates between the loop 13 and the finger grip 3 in a right angular thumb grip 15 transverse to the body section with a terminal eye 17 and by means of which and thumb pressure against the same, the clasp portions 11 may be separated.

The pin section 2 is pivoted at one end to the end of the body section 1 having the loop 7 thereon by means of an eye 19 in said loop rotatable on said portion 8 in said loop 7 which thereby forms a keeper for said pin section 2 and said pin section is bowed into U-shape for insertion through the drilled stem 21 of a button 23 and through a piece of fabric 25 at both sides of the button. As will be clear, the pin section 2 is swingable on an axis transverse to the body section 1 to open and close the fastener. At its other end, the pin section 2 is sharp pointed, as at 27, for piercing purposes and for insertion between the clasp portions 11 and is provided with a side notch 29 for snap action engagement with one of said portions 11. As will be readily understood, the pin section lies in a plane at a right angle to that of the body section 1.

Referring now to the operation of the preferred form, when the pin section 2 is inserted through the shank 21 of the button 23 and the piece of fabric 25, the fastener is closed by inserting its pointed end 27 between the clasp portions 11 until one of said fasteners 11 snaps into the notch 29. Thus, the pin section 2 is locked to the other end of the body section 1 remote from the end to which said section 2 is pivoted and the fastener is locked closed. To unlock the fastener, the thumb grip 15 and the finger grip 3 are squeezed together between a thumb and forefinger. This separates the clasp portions 11 and releases the pin section 2 for withdrawal from the fabric 25 and shank 21 by pulling on the body section 1 with the pin section 2 pivoting on the body section. The loop 13 forms a guard for the pointed end 27 of the pin section 2 when said section is locked.

In the first modified form of the fastener shown in Figures 5, 6, 7 and 8, the pin section, designated 31 is the same as the pin section 2. The body section, designated 33, is formed of a length of resilient wire bent upon itself intermediate its ends to provide a finger grip handling loop 35 at one end of said section 33 and an eye 37 at said end within said loop and in which the eye 39 on the one end of the pin section 31 is engaged so that said pin section 31 can also swing about an axis transverse to the body section 33. The loop 35 terminates in a pair of side-by-side clasp portions 41 relatively separable and forming the other end of the body section 33.

One of the clasp portions 41 is return bent, as at 43, at said other end of the body section 33 into a loop 45 terminating in an eye fitting around the clasp portions 41 at the loop 35 which is to say, intermediate the ends of the body section 33. The other clasp portion 41 terminates in a thumb grip eye 47 looped through the outer end of loop 45 with an end 46 hooked against the other clasp portion 41 and so that thumb pressure on said eye 47 will separate the clasp portions. The pin section 31 is locked to the clasp end of the body section and between the clasp portions 41 with a snap action in the same manner as in the preferred embodiment. By grasping the finger grip loop 33 and exerting thumb pressure against the thumb grip eye 47, the clasp portion 41 on which said eye is formed is separated from the other clasp portion to unlock the pin section 31.

The described first modified form of the fastener is used to fasten a drilled shank button 51 to a piece of fabric 53 in the same manner as the preferred form.

In the second modified form shown in Figures 9 to 12, the pin section 51 corresponds to that in the previously described forms. The body section 52 comprises a flat metal bar at one end of which the pin section 51 is pivoted for swinging about an axis transverse to said bar 53 as follows. Said end of the bar 53 is provided with a pair of top laterally spaced eyes 55. A resilient wire member 57 extends along the top of said bar and is bent upon itself to provide a rectangular loop 59 having a straight bight portion 61 extending through said eyes 55 transversely of the bar 53 and on which the eye 63 on one end of the pin section 51 is rotatable between the eyes 55.

The wire member extends from the loop 59 along the top of the bar 53 to provide a pair of side-by-side relatively separable clasp portions 65 at the other end 67 of said bar 53 and body section and between which the pointed end 69 of the pin section 51 is inserted and through a hole 71 in the end 67 of the bar. One of the clasp portions 65 extends through said hole with a terminal hook 73 straddling the end 67 of said bar 53 from the bottom of said bar to anchor said clasp portion to said bar. The other clasp portion 65 is return bent at one end, as at 75, underneath the bar 53 having a terminal right angled guide finger 77 extending upwardly through a slot 72 in said bar and laterally movable therein to permit said other clasp portion to be flexed for separating said clasp portions 65 to unlock the pin section 51 which is locked by its notch 79 engaging the anchored clasp portion 65.

A finger grip notch 80 is provided in one side edge of the bar 53. By placing a finger in the notch 80 and inserting a thumb nail against the re-bend 75 and squeezing the finger and the thumb together, the clasp portion 65 having the return bend 75, which is to say, the other clasp portion may be flexed laterally to separate said clasp portions 65 for unlocking the pin section so that the fastener may be opened. The guide finger 77 and slot 71 limit flexing of the clasp portion having the return bend.

Figure 11:
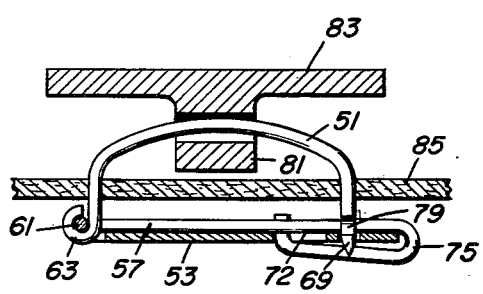
Figure 11 is a view in longitudinal section taken on the line 11—11 of Figure 9 showing the pin section inserted through the drilled shank of a button and through a piece of fabric shown in full lines.
Figure 12:
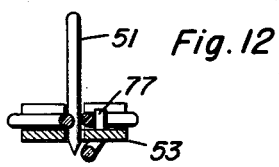
Figure 12 is a view in transverse section taken on the line 12—12 of Figure 9.

As shown in Figure 11, the pin section 51 is inserted through the shank 81, of a button 83 and through a piece of fabric 85 to fasten the button in place just as in the other forms.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention as claimed.

What is claimed as new is as follows:

1. A button fastener comprising a bowed U-shaped pin section for insertion through a piece of fabric and the drilled shank of a button, an elongated body section, means pivotally connecting one end of said pin section to one end of said body section for swinging about an axis transverse to said body section to open and close the fastener, and coacting snap action locking means on the other end of the body section including a pair of resilient side-by-side normally engaging clasp portions of said body section, one of said portions being flexible laterally to separate said portions for unloocking said pin section, said one portion forming a thumb grip and terminating in a lateral free end extending crosswise of the body portion and at an angle to said one portion.

2. A button fastener as in claim 1, said body portion comprising a bowed finger grip section connecting said ends thereof, said first named means comprising a loop at the first named end of the body section having a portion of said finger grip section traversing the same, and an eye on the first named end of said pin section rotatable on said traversing portion within said loop.

3. A button fastener as in claim 1, said body section comprising a flat bar, said clasp portions comprising a length of resilient wire extending along said bar and bent upon itself to provide said side-by-side clasp portions and a loop connecting said portions and provided with a bight portion, said first named means comprising a pair of eyes bent on one end of said bar with said bight portion extending therethrough, and an eye on the first named end of the pin section rotatable on said bight portion between said pair of eyes.

References Cited in the file of this patent

UNITED STATES PATENTS

| | | |
|---|---|---|
| 156,721 | Young | Nov. 10, 1874 |
| 326,080 | Cavelle | Sept. 8, 1885 |
| 834,802 | Hazen | Oct. 30, 1906 |
| 1,028,784 | Raupach | June 4, 1912 |
| 1,471,265 | Hughen | Oct. 16, 1923 |

FOREIGN PATENTS

| | | |
|---|---|---|
| 10,881 | Great Britain | of 1895 |